United States Patent [19]

O'Brien

[11] Patent Number: 4,544,488
[45] Date of Patent: Oct. 1, 1985

[54] AIR STRIPPING/ADSORPTION PROCESS FOR REMOVING ORGANICS FROM WATER

[75] Inventor: Robert P. O'Brien, Bethel Park, Pa.

[73] Assignee: Calgon Corporation, Pittsburgh, Pa.

[21] Appl. No.: 628,092

[22] Filed: Jul. 5, 1984

[51] Int. Cl.⁴ .............................................. B01D 15/00
[52] U.S. Cl. ................................... 210/664; 210/669; 210/673; 210/694
[58] Field of Search ............... 210/664, 669, 673, 694, 210/908–910

[56] References Cited

U.S. PATENT DOCUMENTS

| | | | |
|---|---|---|---|
| 3,198,441 | 8/1965 | Facius | 239/550 |
| 3,807,145 | 4/1974 | Engalitcheff, Jr. et al. | 55/257 |
| 4,080,287 | 3/1978 | Conway et al. | 210/694 |
| 4,289,505 | 9/1981 | Hardison et al. | 210/694 |

OTHER PUBLICATIONS

Calgon Air/Water Report, vol. 15, No. 1, (Feb. 1984), pp. 3 and 4.
Pilot Studies—Combining Granular Carbon and Air Stripping for the Treatment of Contaminated Groundwaters, AWWA National Conference, Dallas, Texas (June 1984).
Baltimore Aircoil Bulletin No. S220/1-0, "Ejector II Cooling Towers".

Primary Examiner—Ivars Cintins
Attorney, Agent, or Firm—Michael C. Sudol; R. Brent Olson; William C. Mitchell

[57] ABSTRACT

The instant invention is directed to a process for removing volatile and nonvolatile organic chemicals from water comprising: (1) passing said water through an induced draft air stripper; and (2) passing the effluent of said induced draft air stripper through a carbon adsorption bed.

11 Claims, 2 Drawing Figures

AIR STRIPPING/ADSORPTION PROCESS FOR REMOVING ORGANICS FROM WATER

BACKGROUND OF THE ART

Industrial and municipal waters oftentimes contain a combination of volatile and nonvolatile organic contaminants. Treatment objectives for these waters vary depending on regulatory standards, treatment costs and the intended use of the water. For example, in drinking water applications and in some food and pharmaceutical process applications, the treatment objective usually requires removal of organic chemicals to nondetectable levels.

This invention relates to a process for the treatment of water, especially groundwater, which contains volatile and nonvolatile organic contaminants. This process can economically remove these organic contaminants to any desired concentration level, including nondetectable levels, and therefore constitutes a notable advance in the art of water treatment.

Two technologies are commonly used in the art for the treatment of groundwater. These include the use of packed tower air strippers and the use of activated carbon. Packed tower air strippers are effective in removing up to 99 percent of volatile organics from groundwater, but, due to size and energy contraints, generally cannot reduce the volatiles to nondetectable levels. Also, they cannot remove nonvolatile organics such as pesticides from groundwater and are subject to fouling, scale and/or biological growth.

Activated carbon alone can remove both volatile and nonvolatile organics, but a "nondetectable" treatment objective oftentimes requires a high carbon dosage, quite possibly making operating costs unacceptably high.

Accordingly, the need exists for a low cost method of reducing both volatile and nonvolatile organic contaminant levels in water, especially groundwater, streams to nondetectable levels, i.e. less than 1.0 ppb.

It is therefore an object of this invention to provide a process for the removal of volatile and nonvolatile organic chemicals from water, especially groundwater, preferably to nondetectable levels. Groundwater includes, but is not limited to, water which is contaminated by agricultural chemicals, such as pesticides, herbicides and fertilizers, chemical spills, septic tank leakage, storage tank leakage, landfill leachate and lagoon leachate.

It is a further object of this invention to provide a process for the removal of organics from groundwater which minimizes operator attention, maintenance and cost of removal.

It is still a further object of this invention to provide a process for the removal of organics from groundwater which eliminates the use of packed tower air strippers, and associated fouling due to scale and/or biological growth.

These and other objects of this invention are accomplished by a process in which contaminated water containing volatile and nonvolatile organic contaminants is passed through an induced draft air stripper followed by passing the effluent of said induced draft air stripper through a carbon adsorption bed, thereby removing said organic contaminants according to treatment objectives, which in many cases may require removal to nondetectable levels.

BRIEF DESCRIPTION OF THE INVENTION

DETAILED DESCRIPTION OF THE INVENTION

Figure 1:
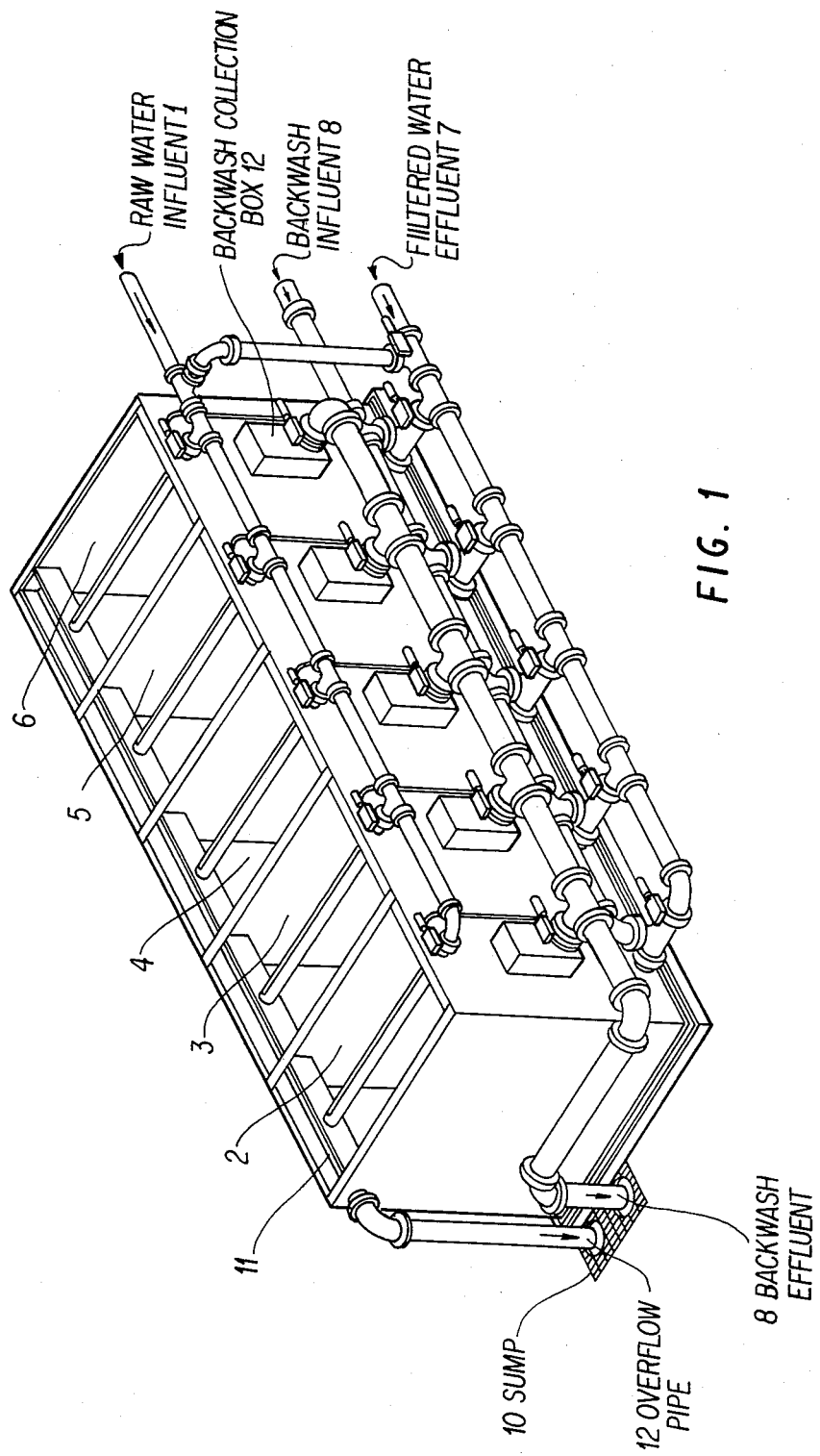
FIG. 1 shows a preferred adsorber for use in the instant process.

This invention relates to a process for removing volatile and nonvolatile organic compounds from water comprising: (1) passing said water through an induced draft air stripper; and (2) passing the effluent of said induced draft air stripper through a carbon adsorption bed. Optimally, volatile and/or nonvolatile organic contaminants are removed to nondetectable levels by this process. In the preferred method of operation, the carbon bed receives water flow directly from the stripper without requiring an intermediate pumping stage. Thus, the preferred process comprises passing water containing volatile and nonvolatile contaminants through an induced draft air stripper and passing the effluent from the stripper through a gravity flow carbon adsorber.

Capitalizing on the unique advantages of each treatment step, this process relies on the air stripper to remove 60 to 85 percent of the volatile organic contaminants. The carbon bed then removes the remaining volatile and nonvolatile organic contaminants. Additionally, the carbon adsorber may serve as a media filter, filtering suspended solids flowing directly from or metal oxides that may be formed during the air-stripping step of the instant process.

The instant process may be practiced using an apparatus comprising an induced draft air stripper, a carbon adsorber, activated carbon and associated piping, valves and instrumentation.

In operating an induced draft air stripper, a water stream, such as a groundwater stream, is injected through spray nozzles at one end of the stripper. The water induces large quantities of air into the stripper chamber cocurrent with the water stream. This allows excellent air-water contact for effective removal of volatile compounds, which exit with the air to the atmosphere.

The induced draft stripper of the instant invention comprises a rectangular-shaped enclosure having a spray tree at one end and eliminators at the other end. The bottom of the stripper forms a sump which collects the treated water separated from the air by the eliminators. Large quantities of air are pulled into the stripper by the water to be treated as it is injected through spray nozzles at the inlet end of the stripper. Thorough mixing of air and water in the chamber permits stripping to take place without the need for packing or fill. Thus, the induced draft stripper provides the advantages of a packed bed stripper without any moving parts or packing and without the disadvantages inherent in the use of packed bed strippers. For example, induced draft air strippers do not contain a medium which provides growth sites for microorganisms, and these units easily adapt to flow and contaminant concentration fluctuations. Also, they are low maintenance items because they contain no moving parts and they create low noise levels during operation.

Aspects of the mechanical design of the Calgon induced draft stripper discussed herein are described in greater detail in U.S. Pat. Nos. 3,807,145 and 3,198,441, which are hereby incorporated by reference into this application. These units are commonly used in the art as cooling towers; however, their use as air purification devices is unknown in the art.

Capacities of induced draft strippers typically range from approximately 5 gallons per minute to approximately 5000 gallons per minute or more. Preferably, the flow rate through these units ranges from 15 to 2500 gpm. Air/water ratios should exceed 200:1, on a volume:volume basis. The preferred range is 500:1 to 2000:1, on a volume:volume basis. This allows a properly sized stripper to remove 65 to 85 percent of a wide variety of volatile organics, including but not limited to compounds such as benzene, xylene and toluene. The stripper is especially effective for removal of halogenated volatile compounds, including but not limited to trichloroethylene, 1,1,1-trichloroethane, 1,1-dichloroethane, 1,1-dichloroethylene, tetrachloroethylene,cis-1,2-dichloroethylene, ethylene dibromide and chloroform. The concentrations of these components in water to be treated may vary over a wide range. In the case of groundwater, it is typical to find concentrations of each contaminant in the range of 10 ppb to 10 ppm.

The ratio of induced air to water created by the injection process varies according to the nozzle used. High air/water ratios produce high removal efficiencies, but at a higher energy consumption, measured in terms of pressure drop across the nozzles. Air strippers should be designed to give acceptable removal efficiencies, while minimizing energy consumption. Thus, any nozzle which produces air/water ratios greater than 200:1, on a volume:volume basis, can be used in the instant process.

Any suitable apparatus containing activated carbon can be used for the adsorption portion of this process. For example, a pulse bed adsorber comprising a pressure vessel having a conical bottom, designed for upflow operation and containing activated carbon, can be used. The influent to such an adsorber is introduced in the bottom section at a flow rate of from approximately 5 to 10 gallons per minute per square foot of adsorber area. The height of the vessel is determined by the amount of activated carbon required to yield the desired contact time. Pulse bed adsorbers are generally rated pressure vessels which can be operated in pressurized modes; however, non-pressure vessels operated downflow as gravity beds can also be used. If the adsorber is operated in a pressure mode, an intermediate pump will be required to transfer the effluent from the air stripper to the inlet of the adsorber. The carbon used in the instant process may be powdered or granular. The preferred carbon is granular activated carbon.

When sufficient carbon has been exhausted to require an adsorber or an adsorber section to be withdrawn from service, either in situ regeneration or a transfer operation must be initiated. If the latter is chosen, fresh carbon, which may be virgin or regenerated, is placed in the adsorber or the adsorber section to replace the exhausted carbon, and the unit is placed back on-line to resume treatment. The carbon removed may then be regenerated on site in a separate vessel or at an off-site regeneration facility. Alternatively, the adsorber or adsorber section may be held idle while on-site regeneration occurs. Upon completion of the regeneration step, the carbon is returned to the adsorber or adsorber section from the regeneration vessel. Steam or thermal regeneration techniques may be used.

The preferred carbon adsorption system comprises a gravity flow carbon adsorber and granular activated carbon. Spent carbon is regenerated using steam. Also, the air stripper is situated above the gravity carbon adsorber, thereby eliminating a sophisticated pumping and flow control system between the air stripper and carbon system.

The preferred gravity carbon filter is segmented into a plurality of carbon compartments, which allows a staggered start up of the carbon system. With staggered operation, blending of effluents from the carbon segments is possible, which produces an effluent of uniform quality.

The most preferred gravity flow adsorber thus comprises a rectangular box with three to five segmented compartments. Each compartment preferably contains an approximately equal volume of granular activated carbon. Effluent from the air stripper flows by gravity to a distribution header at the top of the adsorber. Appropriate valving exists so as to allow flow through the segments of the adsorber in any of a number of possible parallel combinations. After departing from the influent header, the air-stripped water flows downward through the segments of the adsorber according to the flow pattern established using the previously mentioned valves. Underdrains are designed so as to prevent channeling in the carbon sections. Effluent from the carbon adsorption sections is collected in a discharge header where it is discharged to its next use. The segmented gravity adsorber typically is equipped with appropriate pressure indicators so that pressure drop across any segment can be measured. If the pressure drop across a segment becomes unacceptably high, that segment can be backwashed to restore the pressure drop to acceptable levels. Thus, the adsorber is also equipped with a backwash header connected to overflow lines from each adsorber segment and an influent backwash line which provides backwash water to the adsorber sections.

During the backwash operation, backwash water is admitted to the segment being backwashed at a controlled rate not to exceed 20 gpm/ft$^2$, preferably 10 to 15 gpm/ft$^2$. The recommended backwash rate is dependent to some extent upon the temperature of the backwash water. The backwash water is uniformly distributed across the bottom of the cell and forces its way up through the granular activated carbon, expanding it and carrying away the solids which have been filtered and retained in the carbon. This water then flows over a backwash trough, through a collection box and out through a backwash header to waste.

Adsorbers may be designed so as to allow an adsorber section to be backwashed while the other sections are on stream. These adsorbers are thus called "in service" adsorbers. In a less expensive design, the entire adsorber must be taken off-line to backwash an individual bed. Such adsorbers are known as "out of service" adsorbers.

When the carbon in an adsorber becomes spent, i.e. saturated with adsorbed impurities, the carbon can be regenerated in situ or it can be removed from the adsorber and regenerated at either an on-site or an off-site regeneration facility. If off-site or on-site regeneration is used, the adsorber may be immediately re-charged with fresh activated carbon, which may be either virgin carbon or regenerated carbon. Thus, regenerated and/or virgin carbon may be stored on site for immediate use in an adsorber. Alternatively, an adsorber or adsorber section may remain idle until on-site regeneration is completed and the regenerated carbon is transferred back into the adsorber or adsorber section from the on-site regeneration vessel.

The adsorption unit is sized based on the water flow rate discharging from the air stripper. Sufficient volume must be provided to yield an appropriate contact time. Typically, a 5- to 30-minute contact time, at design flow, provides adequate removal. A 15- to 20-minute contact time is preferred. The carbon dosage, or pounds of carbon required per gallon of water, will be dependent upon the water throughput, the treatment objective, the contaminant level of the water being treated and the length of the mass transfer zone relative to bed depth.

Any activated carbon, including both granular and powdered carbons, may be used in the process of this invention without departing from the spirit of the invention. However, a granular activated carbon should be used with the preferred gravity flow adsorbers of this process, such as type Filtrasorb-300 Carbon, available from Calgon Corporation, Pittsburgh, Pa. Further, the carbon should be chosen according to accepted design parameters; for example, it should have sufficient particle size so as to minimize pressure drop through the adsorption beds, while having an acceptable capacity for the components to be adsorbed from the water stream. A preferred carbon has the following characteristics:

| | |
|---|---|
| Iodine No. (minimum) | 900 |
| Abrasion No. (minimum) | 75 |
| Effective Size (minimum) | 0.8-0.9 |
| Screen Analysis: | |
| On 8 Mesh (maximum percent) | 15 |
| Through 30 Mesh (maximum percent) | 4 |
| Water-Soluble Ash (maximum percent) | 1 |
| Moisture (maximum percent) | 2 |

A preferred adsorption unit designed for use in the instantly claimed process is shown in FIG. 1. In FIG. 1, influent groundwater containing organic contaminants enters inlet header 1 marked "raw water influent". From this header, the influent water passes into compartments 2 through 6, which contain activated carbon and thus which remove organics from the water while simultaneously filtering suspended solids. After passing through the carbon compartments, the treated water exits the adsorber via line 7 marked "filtered water effluent". Backwash water enters through the "backwash influent" line 8 and exits via the "backwash effluent" line 9 to sump 10.

FIG. 1 shows an "in service" adsorber design. Note that the walls separating segments 2 through 6 are above the overflow trough 11, which is connected to "overflow pipe" 13, water inlets, and backwash collection boxes 12, thereby allowing backwashing of a single compartment without removing the adsorber from service.

Figure 2:
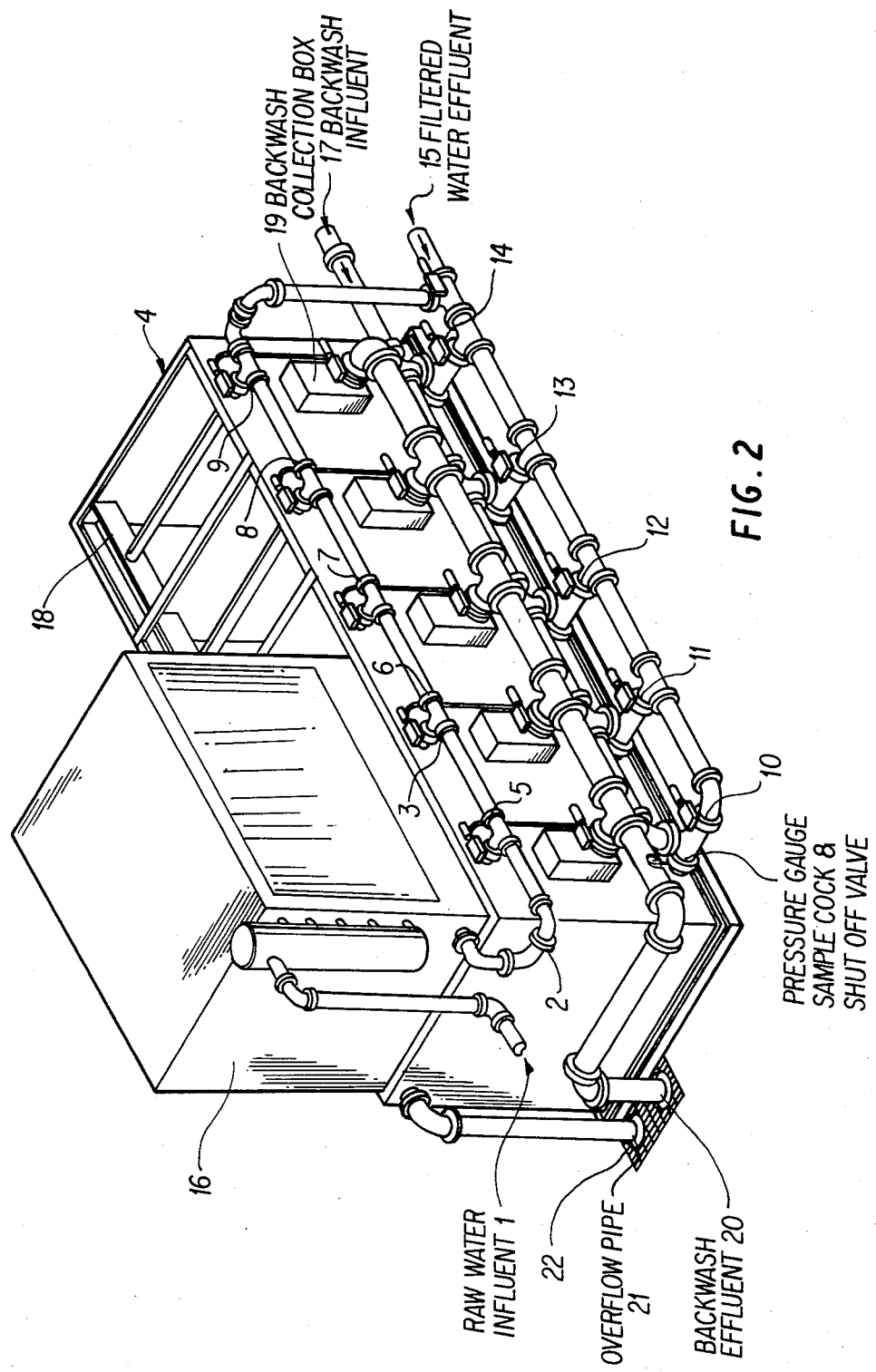
FIG. 2 shows an apparatus for implementation of the instant process comprising an induced draft air stripper and a gravity flow carbon adsorber.

FIG. 2 shows a preferred system. Raw water enters the air stripper 16 via "raw water influent" line 1. Typically, 60 to 85 percent of the volatile organic compounds contained in groundwater are removed by air stripper 16. Water discharges from the basin of the air stripper and flows by gravity via line 2 into inlet header 3 of gravity flow adsorber 4, which, as shown, is of the "in service" type, but which may be of the "out of service" type. This adsorber is segmented into compartments, as described in FIG. 1, which contain activated carbon, such as Filtrasorb-300 Carbon available from Calgon Corporation. Valves 5 through 9 and 10 through 14 are opened and closed so as to arrange the desired flow pattern through the adsorption vessel. Thus, the water can be made to flow through any or all of the compartments simultaneously in a parallel manner. If desired, flow through the sections can be staggered so that the effluent from each segment is blended in "filtered water effluent" header 15. The carbon in the segments of the adsorber removes residual volatile organic contaminants from the air-stripped groundwater and nonvolatile organic contaminants while additionally acting as a media filter. Thus, the system can be operated to remove both volatile and nonvolatile organic contaminants to nondetectable levels and suspended solids. This type of operation is required in potable water applications and in food and pharmaceutical related processes. The adsorber is, as described in reference to FIG. 1, equipped with "backwash influent" line 17, which can be used to fluidize and backwash any particular segment of the adsorber if the pressure drop through that section becomes unacceptably high. Accordingly, each section also contains an overflow trough 18, which is connected to "overflow pipe" 21 and "sump" 22, to handle a flow of groundwater from the air stripper which, for some reason, encounters a blocked or plugged adsorber section, and a backwash collection box 19 connected to a "backwash effluent" line 20 for backwashing.

The combined gravity flow adsorber/air stripper unit can be located either indoors or outside; if freezing is a possibility during colder months, it may be desirable to locate the system inside a heated building. In such a case, the system should be designed so as to vent the contaminant-laden air stream exiting from the stripper from the building. Preferably, exposed piping should be enclosed in a building, while the unit itself remains outside.

It is noteworthy that in the preferred design, the air stripped water enters the carbon adsorber for removal of nonvolatile organics and for further removal of volatile organic contaminants without elaborate flow control or pumping devices. The initial removal of volatile organic carbons in the air stripping step enhances carbon life by as much as 70 percent in the second stage of the process, which minimizes total treatment cost. Additionally, the carbon adsorber functions as a backwashable media filter to remove any metal oxides formed in the air stripping process, minimizing maintenance and eliminating additional treatment steps. If in situ steam regeneration is used, carbon transfers are minimized, thereby minimizing carbon attrition.

The instant process gives results which are not economically achievable with air strippers or carbon adsorption alone. In fact, these technologies supplement each other synergistically in terms of operating parameters. For example, adsorption improves as the molecular weight of the contaminant increases, while air stripping efficiency improves as molecular weights decrease; and adsorption decreases as temperature increases, while air stripping efficiency improves as temperature increases. Thus, each individual step of the instant process provides excellent removal in operating ranges that the other technology optimally does not cover. This synergism allows economical removal of impurities to nondetectable levels (i.e. less than 1 ppb), irrespective of feed stream quality. Such removal may not be economically obtainable with either technology individually.

EXAMPLES

The following examples further illustrate the instant process. However, in no way should they be construed as limiting the instant process.

Examples 1–5 were performed using an induced draft air stripper able to treat 20 to 50 gallons per minute. Two nozzles (A and B) were available. When equipped with nozzle A, the average air to water ratio was 920, on a volume:volume basis. Flows varied according to inlet pressure; for example, flow at 45 psig was 28 gallons per minute, flow at 30 psig was 23 gallons per minute and flow at 15 psig was 17 gallons per minute. When nozzle B was used, the air to water ratio decreased to approximately 580 and flows again varied according to inlet pressure. For example, at 30 psig flow was 46 gallons per minute and 15 psig flow was 33 gallons per minute. These values show energy/air-to-water ratio tradeoffs for two nozzles. Nozzle A yielded higher air-to-water ratios than Nozzle B, but the pressure drop across Nozzle A was higher at a given flow rate, requiring more pumping energy. Nozzle B gave lower air-to-water ratios, and thus lower removal efficiency, but also required less energy (at equivalent flow rates) than Nozzle A. Data for examples 1–5 is presented in Table A.

The data reported shows the percent removal of certain chloro-organic contaminants. In Example 1, nozzle B was used. The influent water contained 285 parts per billion (ppb) of trichloroethylene and 155 ppb of tetrachloroethylene. Flow rate, influent pressure, effluent concentration of trichloroethylene and tetrachloroethylene and percent removal of each contaminant are reported in FIG. 1.

In Example 2, nozzle B was used. The influent water contained 147 ppb of 1,1,1-trichloroethane and 75 ppb of trichloroethylene. In Example 3, nozzle B was used and the influent contained 54 ppb of tetrachloroethylene. In Experiment 4, nozzle A was used and the influent contained 516 ppb of trichloroethylene and 200 ppb of 1,1,1-trichloroethane. In Example 5, nozzle A was used and the influent contained 77 ppb of 1,1-dichloroethane and 28 ppb of 1,1-dichloroethylene.

The "Accelerated Carbon Test" accelerates the carbon adsorption cycle through a scaling down of column testing hardware. The test correlates data obtained using the "Accelerated Carbon Test" procedure with actual data obtained from a one-inch column study, and accurately predicts breakthrough of organic contaminants in water.

| Example | Contaminant | Influent Conc. (ppb) | Effluent Conc. A/S | A/S and Carbon | Percent Removal |
|---|---|---|---|---|---|
| 6 | 1,1-Dichloroethane | 83 | 26 | ND[1] | 100 |
| 7 | 1,1,1-Trichloroethane | 93 | 32 | ND | 100 |
| 8 | Trichloroethylene | 72 | 22 | ND | 100 |

[1]Nondetectable, meaning less than 1 ppb

What is claimed is:

1. A process for removing volatile and non-volatile organic compounds from water comprising: (1) injecting said water into an induced draft air stripper through spray nozzles, thereby inducing air into said air stripper; (2) allowing mixing of said water and air to occur in said air stripper, thereby causing stripping of volatile compounds from said water by said air, and then allowing the air containing said volatile compounds to exit said air stripper to atmosphere; and (3) passing the effluent water from said air stripper through a carbon adsorption bed for removal of non-volatile organic compounds.

2. The process of claim 1 wherein said activated carbon adsorption bed is a gravity flow bed, and wherein said adsorber receives water directly from said induced draft air stripper without requiring intermediate pumping.

3. The process of claim 2 wherein said induced draft air stripper produces air:water ratios greater than 200:1, on a volume:volume basis, wherein said activated carbon adsorption bed contains granular activated carbon, and wherein said carbon adsorption bed provides a contact time between 5 and 30 minutes.

4. The process of claim 3 wherein volatile and non-volatile organic compounds are removed to nondetectable levels.

5. The process of claim 3 wherein said granular activated carbon is regenerated using steam.

TABLE 1

| Example No. | Nozzle | Flow (gpm) | Pressure (psig) | Contaminant | Influent Concentration (ppb) | Effluent Concentration (ppb) | Percent Removal |
|---|---|---|---|---|---|---|---|
| 1 | B | 42 | 25 | trichloroethylene/tetrachloroethylene | 285/155 | 57/21 | 80.0/86.5 |
| 2 | B | 42 | 25 | trichloroethane/trichloroethylene | 147/75 | 40/17 | 72.8/77.3 |
| 3 | B | 42 | 23.5 | tetrachloroethylene | 54 | 13 | 75.9 |
| 4 | A | 25 | 38 | trichloroethylene/trichloroethane | 516/200 | 118/47 | 77.1/76.5 |
| 5 | A | 25 | 38 | dichloroethane/dichloroethylene | 77/28 | 18/9 | 76.6/67.9 |

Examples 6 through 8 show the combined effect of air stripping and activated carbon treatment. In each case, an air stream contaminated with a chloro-organic was treated by air stripping, as described in Examples 1 through 5, and then treated with activated carbon. The carbon used was Type F-300, available from Calgon Carbon Corporation, Pittsburgh, Pa.

Activated carbon tests were run using the "Accelerated Carbon Test", developed by Calgon Carbon Corporation, Pittsburgh, Pa. This test is described in a brochure, available from Calgon Carbon Corporation, entitled "Calgon Accelerated Column Test", which is hereby incorporated into this application by reference.

6. The process of claim 1 wherein said water is groundwater.

7. A process for removing volatile and non-volatile organic chemicals from water comprising: (1) injecting said water into an induced draft air stripper through spray nozzles, thereby inducing air into said air stripper; (2) allowing mixing of said water and air to occur in said air stripper, thereby causing stripping of volatile compounds from said water by said air, and then allowing the air containing said volatile compounds to exit said air stripper to atmosphere; and (3) passing the effluent water from said air stripper through a gravity flow activated carbon adsorber for removal of non-volatile organic compounds, wherein said adsorber contains a plurality of compartments, each of which is backwashable, and wherein said adsorber receives water directly from said induced draft air stripper without requiring intermediate pumping.

8. The process of claim 7 wherein said water is groundwater.

9. The process of claim 7 wherein said induced draft air stripper produces air:water ratios greater than 200:1, on a volume:volume basis, wherein each adsorber compartment contains granular activated carbon, and wherein the contact time through each compartment is between 5 and 30 minutes.

10. The process of claim 9 wherein volatile and non-volatile organic compounds are removed to nondetectable levels.

11. The process of claim 9 wherein said granular activated carbon is regenerated using steam.

* * * * *

UNITED STATES PATENT AND TRADEMARK OFFICE
CERTIFICATE OF CORRECTION

PATENT NO. : 4,544,488
DATED : October 1, 1985
INVENTOR(S) : ROBERT P. O'BRIEN

It is certified that error appears in the above—identified patent and that said Letters Patent are hereby corrected as shown below:

On the title page, Item [73] should read

-- Calgon Carbon Corporation,

Pittsburgh, Pennsylvania --.

Signed and Sealed this

Twenty-fifth Day of November, 1986

*Attest:*

DONALD J. QUIGG

*Attesting Officer*     *Commissioner of Patents and Trademarks*